April 6, 1948.  W. WATERMAN  2,439,118
AUTOMATIC CUTOFF DEVICE
Filed July 31, 1942
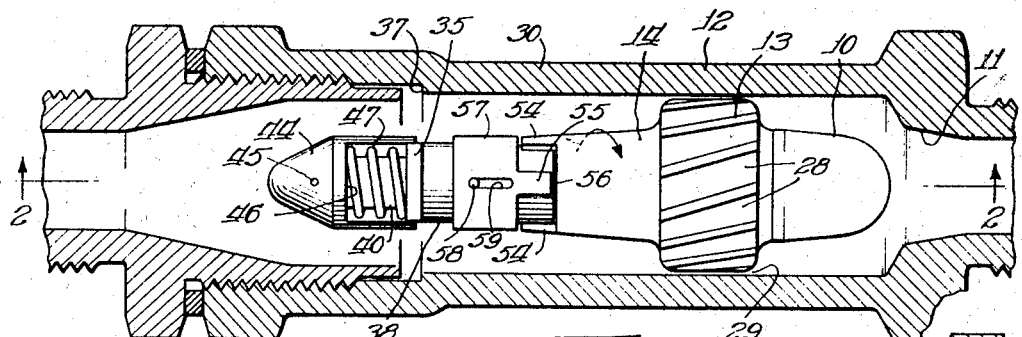
Fig. 1
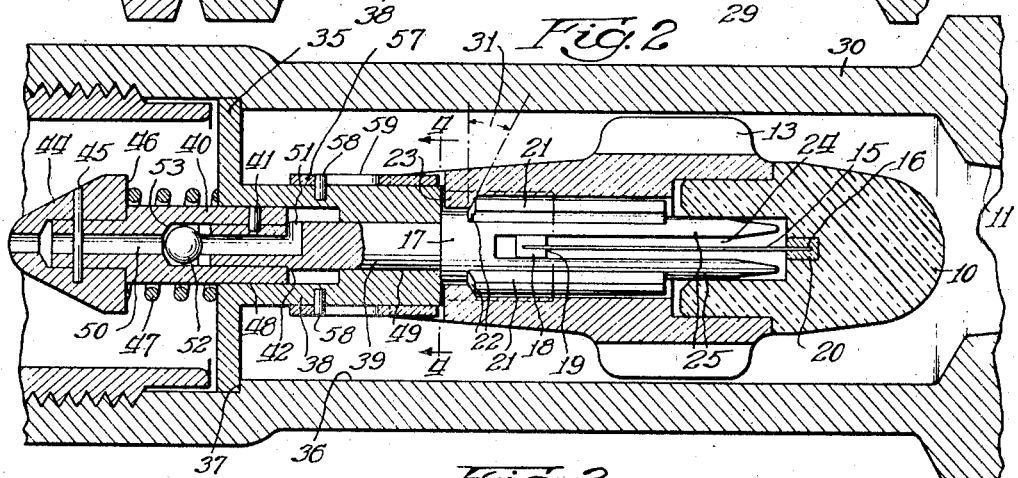
Fig. 2
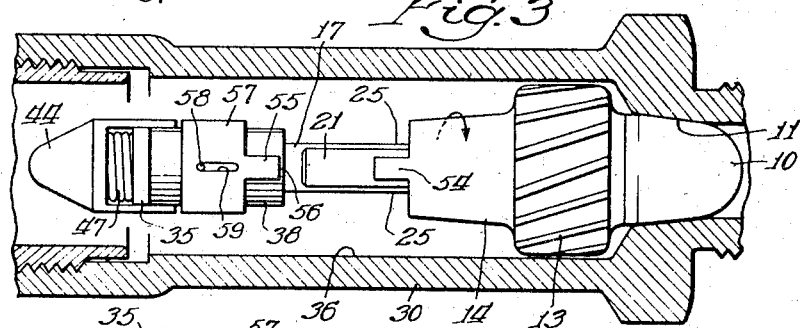
Fig. 3
Fig. 4
Inventor:
William Waterman
By Roland C. Lehman
Atty.

Patented Apr. 6, 1948

2,439,118

UNITED STATES PATENT OFFICE 2,439,118

AUTOMATIC CUTOFF DEVICE

William Waterman, Chicago, Ill.

Application July 31, 1942, Serial No. 452,991

12 Claims. (Cl. 137—152)

This invention relates to automatic cut-off devices, and among other objects aims to provide improved devices for automatically restricting or cutting off fluid flow under predetermined conditions.

The nature of the invention may be readily understood by reference to illustrative devices embodying the invention and shown in the accompanying drawings.

In said drawings:

Fig. 1 is a large scale elevation partly in longitudinal section of one of the devices in open or "set" condition;

Fig. 2 is a longitudinal section on still larger scale of the device shown in Fig. 1;

Fig. 3 is an elevation similar to Fig. 1 showing the device in closed or "cut-off" position;

Fig. 4 is a transverse section taken on the plane 4—4 of Fig. 2.

The device illustrated in Figs. 1 to 4 embodies the inventive principles of my prior devices disclosed in my co-pending applications Serial 425,427 and Serial 438,565. Like my prior devices aforesaid it is designed automatically to restrict or cut off flow in a line if the latter be broken or punctured for any reason. In air craft, for example, it prevents dumping of the entire supply of hydraulic fluid or fuel if the line be fractured by gun fire or by vibration. The device is substantially insensitive to normal fluid flow, gravitational forces, inertia forces, or variation in fluid viscosity, and operates only under predetermined or abnormal conditions, such as excess flow caused by fracture of the line. The improved device may also embody features which render it insensitive to line surges and which permit easy re-setting of the device.

In the aforesaid device the controlling means is represented by a valve 10 adapted to close on seat 11 in the valve housing 12, to restrict or cut off flow. The valve and its seat are advantageously given a relatively long taper so that the valve, when desired, will wedge sufficiently tightly on its seat not to be dislodged by vibration, inertia, etc. As here shown the valve 10 is separately formed and connected by press fit or other appropriate means with the valve body. As in my prior devices, the present device is operated by rotational forces exerted on the valve through the action of the flowing fluid on vanes 13 projecting from the valve body 14 and inclined relative to the axis or direction of flow. As presently pointed out the device also embodies means for compensating for variation in the rotating force on the valve body due to variation in fluid viscosity with the result that the net turning force for operating the valve is substantially constant for a given rate of flow regardless of variations in viscosity. This is of particular importance in air craft where operating temperatures may vary from 150° F. to —40° F. within which range the viscosity of the hydraulic fluid used to operate landing gear, wing and tail flaps, gun turrets, etc. varies from 50 S. S. U. at 150° F. to about 25,000 S. S. U. at —40° F.

In the device illustrated in Figs. 1 to 4 operation will not occur until the net rotational force on the valve substantially exceeds that represented by maximum normal fluid flow. Only when the flow substantially exceeds normal flow due, for example, to fracture of the line, will the net rotational forces be great enough to operate the valve. In this connection it should be understood that in air craft, for example, where every effort is made to reduce unnecessary weight operating fluid pressures commonly reach 1,000 pounds per square inch. Under such pressures flow resulting from a fractured line is apt to be high.

Rotation of the valve under the forces exerted by fluid flow is resisted in the present device by a torsion spring in the form of a flat leaf spring 15 anchored at one end 16 in the valve body. The spring is adjusted in stiffness to prevent substantial or effective rotation of the valve under the maximum normal fluid flow but permitting rotation to release position upon flow in excess of normal. The spring is non-rotatable on valve stem 17 but rendered slidable relative thereto by means of a block 18 of rectangular section in which the free extremity 19 of the spring is anchored. Anchorage of the spring in the valve body is effected in this instance by means of a plug 20 connected to the end of the spring and having a press fit in a recess in the valve. The latter is rotatable on the valve stem 17 (against the resistance of spring 15) but is held against longitudinal movement toward closed position by a releasable lock in the form of a pair of sector-shaped lugs or splines 21 carried on the valve stem against whose ends or shoulders 22 complementary flanges 23 of the valve bear. Partial rotation of the valve to a point where the flanges 23 register with the spaces (with which they correspond in shape) between the splines 21 permits the valve to move forwardly to closed position, the block 18 on the torsion spring sliding in the slot 24 in an extension of the valve stem. The splines 21 serve to hold the valve body and spring 15 against further reverse rotation upon release. Thus the spring remains in its twisted or strained condition while the valve is closed. In the present case, the slot 24 is formed simply by slotting the extension of the valve stem, leaving a pair of spaced projecting prongs 25. The valve is thus never completely disconnected from its stem and may be reset simply by reversing flow in the line to slide the valve back until flanges 23 clear the ends of splines 21, in which position the spring 15 (which is still under stress) rotates the valve body to its locked position in engagement with the ends 22 of splines 21. The angular movement from normal position of the valve (i. e. the unstrained position of spring 15) to release position (where flanges 23 register with the spaces between splines 21) is in this case about 85°.

The rotating force on the valve body increases not only with increase in rate of flow but also with increase in viscosity of the fluid. On the other hand, with increase in viscosity there is a corresponding increase in forces which resist rotation. These increased counter-forces are developed by the increase in frictional drag or axial pull on the valve body (with increase in viscosity) which increase the frictional resistance between the flanges 23 and the shoulders 22 on the splines 21. The frictional drag of the fluid as well as its rotating force on the valve body may be adjusted by varying the spaces 28 between the vanes 13 and the clearance 29 between the valve body and the housing 30 around the valve. The frictional resistance of the valve to rotation also may be adjusted by varying the character of the contacting surfaces between the valve body and the shoulders 22 on the valve stem. In the present case such contacting surfaces comprise the flanges 23 and the shoulders 22. By changing the angle of inclination of the contacting surfaces relative to the direction of flow, the resistance to rotation may be varied. This resistance varies inversely as the cosine of angle 31, that being the angle of inclination of the contacting surfaces relative to a plane transverse to the direction of flow. For example, if such angle were 60° (its cosine being ½) the resistance to rotation would be double what it would be if the angle were 0° (cosine equals 1). The cosine of small angles very nearly approximates 1 and small angles of inclination therefore have little effect in increasing resistance. A small angle, however, is desirable for centering the valve body on the valve stem, thereby eliminating unknown lateral friction between the valve stem and the valve body.

Thus by varying the angle of inclination of the contacting surfaces resistance to rotation of the valve may be adjusted to compensate to any desired degree for the increase in rotational force due to increase in viscosity. The net turning force on the valve being the difference between gross turning force and gross forces resisting or opposing rotation, proper adjustment of the resisting forces as aforesaid, may be employed to produce a net turning force which is constant or independent of variations in viscosity.

To prevent operation or seating of the valve under line surges (which simulate flow in excess of normal) the device may advantageously be provided with means for delaying operation of the valve under certain limited conditions. Line surges generally occur when the line has not been completely bled on filling, i. e., a small amount of air remains in the line. Momentary surges also occur because of compressibility of the oil. Although it has generally been assumed that oil is substantially incompressible, under the high pressures used in some lines, the slight compression of the oil occurring when high pressure is suddenly imposed on a body of oil, causes a momentary surge in the line which is characterized by a momentary flow substantially in excess of normal flow.

In the present case under conditions when surging may occur, the device is designed to permit the flow of a predetermined volume of fluid (being the maximum volume which is transmitted during a surge) before it can be released. In other words, before the valve can operate, the surge will have subsided.

As illustrated more particularly in Fig. 2, the means for surge compensation is here shown in the form of a dash-pot or hydraulic brake arranged to prevent rotation of valve body 14 on its stem for a predetermined time during which the aforesaid surge takes place. In this case the brake is formed by slidably mounting the valve stem 17 in the anchor 35, the latter being relatively narrow to minimize obstruction in the fluid passages 36 and being seated against shoulders 37 in the housing. The anchor is extended forwardly in the form of a cylinder 38 within which the extremity 39 of the valve stem acts as a plunger and the sleeve 40 connected to the valve stem acts as a piston.

Piston 40 is connected to the valve stem by one or more pins 41 and seats against shoulder 42 provided by reducing the extremity of the valve stem.

The leading end of the structure is streamlined to reduce turbulence by means of a cap 44 connected to the plunger by a transverse pin 45. The cap also provides a shoulder 46 between which and the anchor 35 is confined a light spring 47 to return the brake piston to normal position after separation. A body of fluid is confined in the brake cylinder between the piston and the end of the cylinder. Under pressure of the piston the fluid is permitted to escape through an appropriately restricted passage. In the present case, such escape occurs through the restricted passage 48 between the cylinder and piston and through the passage 49 between the plunger and the cylinder. Upon return travel of the piston fluid may enter the cylinder through an axial passage 50 in the valve stem connected with the cylinder space by cross-passage 51. A ball check valve 52 adapted to seat against the seat 53 prevents escape of fluid from the brake cylinder.

Increased closing pull on the valve body resulting from increase in viscosity of the fluid is compensated for by increase in resistance to escape of fluid from the brake, and vice versa. The closing delay effected by the brake is therefore substantially independent of viscosity of the fluid. If necessary adjustment of brake resistance to vary the extent of delay may be effected either by varying the orifices through which the brake fluid escapes or by varying the frictional and other resistance offered by the valve to fluid flow.

Until the valve and valve stem have advanced a predetermined distance against resistance of the brake, the valve is checked against rotation to release position regardless of the rotating force exerted on the valve. The checking means is here shown in the form of one or more projections 54 projecting rearwardly from the valve body and adapted to engage corresponding splines 55 on the anchor. Until the valve body has advanced sufficiently to allow the projections 54 to clear the ends 56 of the splines, rotation sufficiently to release the valve cannot occur. As stated above, the brake is adjusted to delay movement of the valve to release position for such time as may be consumed in a surge as described above. Thereafter (assuming excess flow continues) the stops 54 clear the ends 56 of the spline and the valve completes its rotation until it is able to slide to closed position along the valve stem extension. (See Fig. 3.)

In most instances in air craft operation, surges occur only at the beginning of flow in a line, as where an operating valve is opened. Normal flow will advance the valve against the resistance of the brake, but by the time it has advanced, the danger of surge will have disappeared.

To reset the valve it is moved back either manually or by reversing fluid flow until the flanges 23 clear the shoulders 22 of the splines 21. The residual torsion in spring 15 then rotates the valve to locked position. To prevent accidental resetting of the valve with the projections 54 on the wrong side of splines 55, the latter are carried on a sleeve 57 movable longitudinally of the anchor but nonrotatable with respect thereto. The ends of the splines 55 and projections 54 are made circumferentially wide enough so that they will always at least partially abut when the valve is returned to open position, the sleeve 57 sliding to the rear during this movement. Thereupon the valve will rotate to carry the projections to the proper side of splines 55 and the latter will be again moved forward to normal position (see Fig. 1) by the frictional drag of the fluid thereon. In the present case, the sleeve is slidably connected to the anchor by pins 58 carried on the anchor and projecting into slots 59 on the sleeve.

The increased drag or pull on the brake which accompanies increase in viscosity of the fluid is compensated for by the increased resistance to escape of fluid from the brake by reason of its increased viscosity. Moreover, the lower the fluid velocity the longer the interval necessary for operation of the brake. The result is that the brake retards operation of the valve until a fairly constant volume of fluid has passed regardless of velocity or viscosity.

Spring 47 produces some departure from constancy, since its resistance does not vary with change in viscosity, but this and other slight departures from constancy of volume are not serious.

Obviously the invention is not limited to the details of the illustrative device since these may be variously modified; moreover, it is not indispensable that all features of the invention be used conjointly since various features may be used to advantage in different combinations and subcombinations.

Having described my invention, I claim:

1. An automatic cut-off device comprising in combination a valve housing forming a passage for fluid, a valve in said passage and movable in the direction of fluid flow to close said passage, said valve presenting surfaces to the fluid against which the latter acts to create valve rotating forces, a spring resisting rotation of said valve, means normally holding the valve against closing movement but operative on predetermined rotation of said valve for releasing the latter to close, said spring being designed to permit said predetermined rotation only upon a predetermined rate of flow, and a device for guiding the valve to open position upon application of force thereto opposite to the direction of normal fluid flow.

2. An automatic cut-off device comprising in combination a valve housing forming a passage for fluid, a valve in said passage and movable in the direction of fluid flow to close said passage, said valve presenting surfaces to the fluid against which the latter acts to create valve rotating forces, a spring resisting rotation of said valve, means normally holding the valve against closing movement but operative on predetermined rotation of said valve for releasing the latter to close, said spring being designed to permit said predetermined rotation only upon a predetermined rate of flow, and a guide for preventing reverse rotation of said valve on its release, whereby the valve may be readily returned to open position, in which position said spring rotates the valve to initial position.

3. An automatic cut-off device comprising in combination a valve housing forming a passage for fluid, a valve in said passage and movable in the direction of fluid flow to close said passage, said valve presenting surfaces to the fluid against which the latter acts to create valve rotating forces, a stem along which said valve slides to closed position, and having a torsion spring associated therewith for resisting rotation of said valve, said torsion spring connecting said valve with said stem and resisting rotation thereof on the stem, and a device for holding the valve against closing movement but operative to release the same upon predetermined rotation resulting from predetermined fluid flow, said stem having means operative after release of said valve for preventing reverse rotation thereof, whereby said valve may be easily reset to open position.

4. An automatic cut-off device comprising in combination a valve housing constituting a fluid passage, a valve in said passage movable in the direction of fluid flow to close said passage, said valve having surfaces acted on by the flow of fluid to rotate the same to effect closing, means for normally holding the valve against closing but releasable upon rotation of the valve resulting from flow in excess of a predetermined rate, a projection engaging said valve to prevent rotation, said valve being movable sufficiently in the direction of flow to effect its disengagement from the projection and permit rotation of the valve to close the passage.

5. An automatic cut-off device comprising in combination a valve housing constituting a fluid passage, a valve in said passage movable in the direction of fluid flow to close said passage, said valve having surfaces acted on by the flowing fluid to rotate the same for effecting closing of the valve, means for normally holding the valve against closing but releasable upon rotation of the valve resulting from flow in excess of a predetermined rate, a projection engaged by the valve to prevent rotation thereof until the valve is moved forwardly to clear the projection, and a hydraulic brake for retarding said forward movement of the valve.

6. An automatic cut-off device comprising in combination a valve housing constituting a fluid passage, a valve in said passage movable in the direction of fluid flow to close said passage, said valve having surfaces acted on by the flowing fluid to rotate the same for effecting closing of the valve, resilient means normally holding the valve against closing but releasable upon a predetermined rotating force resulting from flow in excess of a predetermined rate to permit closing of the valve, a projection engaged by the valve to prevent rotation thereof until the valve has moved forwardly a predetermined distance, means for retarding the movement of the valve through such distance, said projection being rearwardly slidable on resetting of the valve in normal position to insure proper reengagement of the valve with said projection.

7. An automatic cut-off device comprising in combination a valve housing forming a passage for fluid, a valve in said passage and movable in the direction of fluid flow to close said passage, said valve presenting surfaces to the fluid against which the latter acts to create valve rotating forces, a spring resisting rotation of said valve, means normally holding the valve against closing but operative on predetermined rotation of said valve resulting from flow in excess of a predetermined rate for releasing the latter to close, said spring being designed to permit said predetermined rotation only upon a predetermined rate of flow, a projection engaged by the valve to prevent rotation thereof until the valve has moved forwardly to clear the projection, means for retarding such forward movement of the valve, and a guide for preventing reverse rotation of said valve on its release, whereby the valve may be readily returned to open position, in which position said spring rotates the valve to initial position, said projection being rearwardly slidable upon return of the valve to open position to insure resetting of the valve on the proper side of the projection.

8. An automatic cut-off device comprising in combination a valve housing forming a passage for fluid, a normally open valve in said passage and movable by the fluid in the direction of the fluid flow to close said passage, said valve provided with surfaces presented to the fluid against which the latter acts to create valve closing forces, means for holding the valve open against the action of the fluid and operated by said force upon a predetermined rate of fluid flow to release said valve, and a device for delaying the operation of said means.

9. An automatic cut-off device comprising in combination a valve housing forming a passage for fluid, a normally open valve exposed to the flow of fluid in said passage and movable by the fluid to close said passage, means holding the valve open against the force of the fluid and against inertia forces, said means permitting the valve to close after a predetermined volume of fluid flow and means for releasing the valve as it approaches its seat.

10. An automatic controlling device comprising in combination a valve housing constituting a fluid passage and having a valve seat, a normally open valve in said housing movable in the direction of fluid flow toward said seat, means for holding the valve open against the action of flowing fluid, said valve having surfaces acted on by the flow of fluid to rotate the valve in a direction transverse to the direction of fluid flow to release said valve from said holding means, and a brake for causing a predetermined delay before release in seating of said valve.

11. In a hydraulic system, a housing adapted to be placed in a hydraulic line and forming a part of the line, a valve member in the line and movable by the hydraulic liquid in the direction of flow, said member having surfaces against which the liquid acts to rotate said member, means for holding the member against movement with the liquid and releasable upon predetermined rotation of said member, a spring resisting rotation of said member and yieldable upon a predetermined rotating force on said member to release said valve to move forward with the flowing liquid, and guide means for guiding said member into reengagement with said holding means upon reverse movement of said member.

12. An automatic cut-off device comprising in combination a housing means formed with a chamber and a seat, a valve member movable against said seat and an alined rod member movable in unison with but separable from said valve member, a valve operating element on one of said members, located in said chamber and having flow passages whereby said element pushes said valve toward said seat under impulse of an amount of flow determinable by said passages, and a spring opposing movement in unison of said valve and rod members during at least a portion of the valve closing movement and operable to return said separable rod member to normal position while said valve member remains seated, said valve member being uninfluenced by the return bias of said spring when in such closed position.

WILLIAM WATERMAN.

REFERENCES CITED

The following references are of record in the file of this patent:

UNITED STATES PATENTS

| Number | Name | Date |
|---|---|---|
| 484,526 | Valentine | Oct. 18, 1892 |
| 1,102,960 | Schindler | July 7, 1914 |
| 1,322,938 | Parker | Nov. 25, 1919 |
| 1,649,735 | Rosechanek | Nov. 15, 1927 |
| 2,024,270 | Binnall | Dec. 17, 1935 |
| 2,081,860 | Quick | May 25, 1937 |
| 2,127,849 | Stone | Aug. 23, 1938 |
| 2,146,092 | Raymond | Feb. 7, 1939 |

FOREIGN PATENTS

| Number | Country | Date |
|---|---|---|
| 125,708 | Germany | Nov. 23, 1901 |
| 107,434 | Great Britain | July 5, 1917 |